Nov. 11, 1930.  L. J. PEARSON  1,781,597
BATTERY TESTER
Filed Feb. 11, 1925
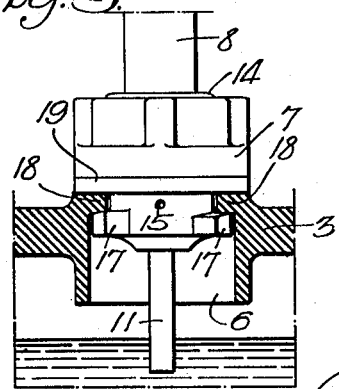
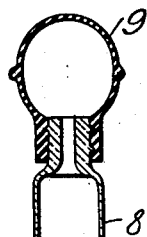
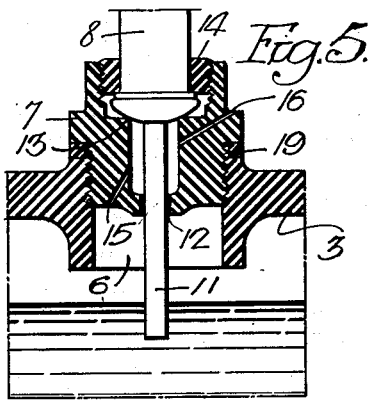
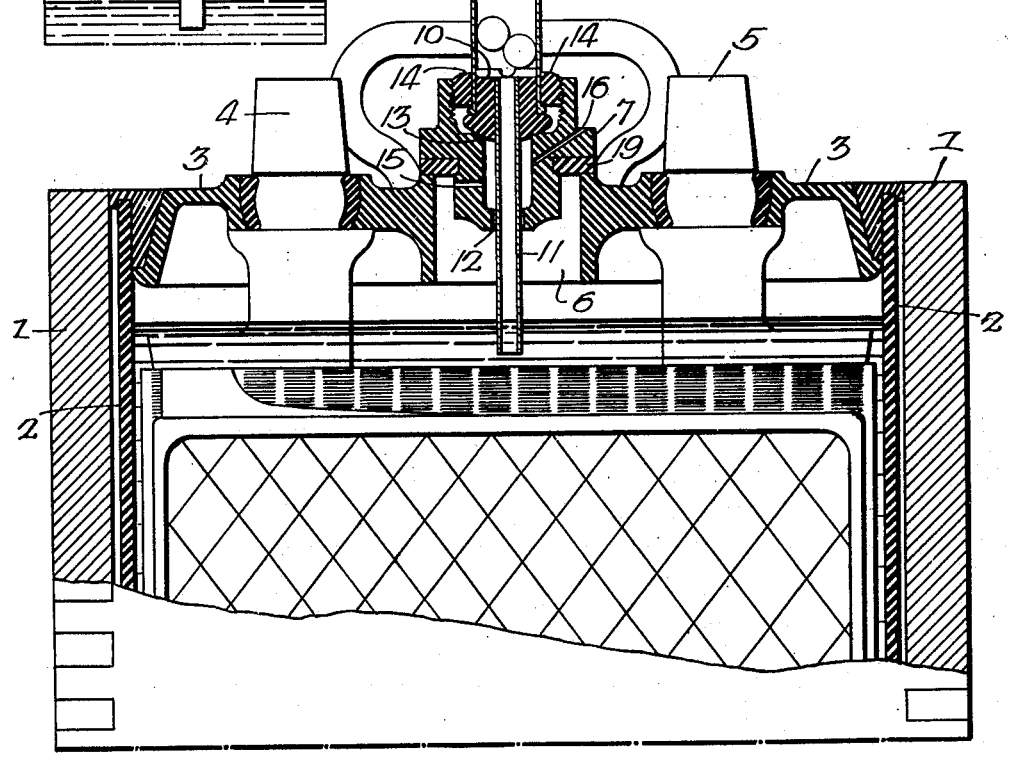
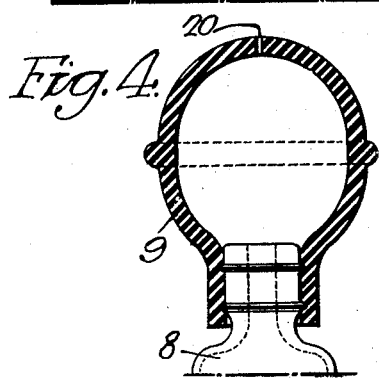
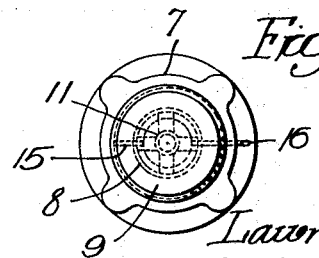
Inventor.
Lawrence J. Pearson
by his Attorneys
Howson & Howson Patented Nov. 11, 1930

1,781,597

UNITED STATES PATENT OFFICE

LAWRENCE J. PEARSON, OF WYNCOTE, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

BATTERY TESTER

Application filed February 11, 1925. Serial No. 8,425.

This invention relates to storage batteries, and the principal object of the invention is to provide a storage battery having simple and convenient means for testing the state of charge and discharge.

The invention has a particular application to lead-acid storage batteries employed in radio work, and is intended to satisfy the demand for easily manipulated means for testing the state of charge, the demand arising from the wide use of storage batteries by individuals unskilled in the art to which they relate and incapable of properly manipulating the devices commonly employed in battery testing.

A further object of the invention is to provide testing means which, while of a detachable nature, is yet a permanent part of the battery structure and operative without removing any of the battery parts.

The invention answers a further useful end in providing means for gaging the level of the electrolyte in the cells, and eliminates the possibility of acid dripping on the outside of the battery in the testing operation.

More specifically the invention contemplates the combination of a convenient and simple battery testing device with one or more of the filler-caps of the storage battery, such arrangement possessing many obvious advantages, both in the process of manufacture and in actual use.

A further feature of the invention is to provide means whereby the tester may automatically drain itself after each testing operation.

A preferred construction whereby the aforedescribed useful ends are accomplished is illustrated in the attached drawings, in which:

Figure 1 is a vertical section through the upper portion of a battery equipped with a device made in accordance with the invention;

Fig. 2 is a plan view of the vent cap including the testing device;

Fig. 3 is a fragmentary section illustrating further details of the device;

Fig. 4 is a fragmentary section through the upper part of the testing device illustrating a modification within the scope of the invention, and Fig. 5 is a sectional view similar to Fig. 3 showing a further modification.

Referring to Figs. 1 and 2 of the drawings, I have there illustrated a portion of a storage battery including the usual case 1 in which are housed one or more cells 2 each sealed at the top in the usual manner and comprising a cover 3 through which extend the terminals 4 and 5. The cover 3 also comprises the filler-port 6 adapted to receive the usual vented detachable filler-cap. The general construction of the storage battery has no part in the present invention, since my device is applicable to storage batteries of practically any type and construction.

Instead of the usual filler cap, however, I provide in the present instance a cap which although conforming generally to the latter carries a device for testing the state of charge or discharge of the battery, and the invention largely resides in the provision of such a testing device which includes a part adapted to function as the filler-cap.

Thus in the embodiment shown in Figs. 1, 2 and 3, the device comprises a body portion 7 constituting the filler cap proper, the body 7 in the present instance being hollow and adapted for reception of a testing device operating on the hydrometer principle. The device in the present instance comprises a glass or other transparent cylinder 8 which carries at its upper end a rubber bulb 9, and which has inserted in its lower end a perforated plug 10, from which extends a tube 11, the latter communicating with the interior of the cylinder 8 and projecting downwardly through an aperture 12 in the bottom of the body 7. As clearly illustrated, the plug 10, which preferably is made of rubber, is seated upon a shoulder 13 in the interior of the cap portion or body 7, and the entire device is held to its seat and secured within the body 7 by means of a threaded sleeve or nut 14 which surrounds the cylinder 8 and is threaded into the upper end of the cap or body 7.

To provide the necessary venting of the cell, suitable channels 15 and 16 are provided which establish communication between the atmosphere and the interior of the cell. The vent channel 16 passes from the interior of the cap portion 7 to the exterior of the latter above the cell, while the channel 15 establishes communication between the interior of the cell and the interior of the said cap portion. The aperture 12 through which the tube 11 projects is in the present instance also made sufficiently large to provide a passage between the interior of the cell and the interior of the cap 7, the object of this being to provide a passage through which any solution entering the interior chamber of the said cap may drain back into the cell.

As clearly illustrated, the nut 14 bears against the lower beaded edge of the cylinder 8, and when screwed into the cap portion 7 forces the plug 10 against the shoulder 13 which constitutes a seat, thus insuring a tight joint at that point and precluding the possibility of leakage of the electrolyte through the device.

As shown in Fig. 3, the lower end of the cap portion 7 may be provided with suitable lugs 17 for coaction with lugs or shoulders 18 on the cover 3 projecting into the filler port 6 whereby the cap may be secured in the cover, and the said cap portion also preferably includes the rubber or other gasket 19 which seals the joint between the cap portion 7 and the cover 3. The lugs 17 may have their upper surfaces, which contact with the under sides of the lugs 18, inclined to the horizontal whereby the cap 7 as it is turned is drawn down tightly on the cover. The cap 7 may also be secured in the cover by means of screw threads, as shown in Fig. 5, if preferred.

The cylinder 8 contains two balls of different densities, the positions of which, when electrolyte is drawn up into the cylinder, will indicate the state of charge. Thus, for example, the densities may be such that when the battery is fully charged and the electrolyte consequently at maximum density, both balls will float; if partially charged, one ball will continue to float while the other one sinks; and the sinking of both balls will indicate that the density of the electrolyte has fallen, owing to the discharge of the cell, to the point where the battery needs charging.

Under operating conditions, the lower end of the tube 11 is submerged in the electrolyte, and the length and position of the tube may be such that the lower edge or opening will correspond in position to the lowest allowable level of the electrolyte. Pressure of the bulb and subsequent expansion will cause electrolyte to be drawn upward into the cylinder 8. Obviously when the level of the electrolyte falls below the bottom of the tube 11, failure of the electrolyte to enter the cylinder 8 as the bulb 9 expands will indicate that the cells should be replenished with water, and the device thereby constitutes a means for determining whether or not the electrolyte is above the lowest allowable level.

Although the continued presence of the electrolyte in the cylinder 8 will have no bad effects, it may be desirable under some circumstances to insure a more or less prompt return of the electrolyte from the tester to the cell, and for this purpose, I may provide the bulb with a minute hole, indicated at 20 in Fig. 4, this hole giving a sufficient leakage of air to provide for the slow return of the electrolyte to the cell.

Obviously the invention is subject to considerable modification without departure from its essential features.

I claim:

1. An electric battery comprising a container having a port, a closure for said port recessed from the outside, a density-testing device comprising a transparent hollow member seated in the recess and containing at least one detached body of predetermined density, a collar adapted to be threaded into the recess to retain the member in position, said closure having a vent independent of said testing device, and means for drawing electrolyte from the battery into said member when the closure is in position in the port.

2. An electric battery comprising a container having a port, a closure for said port having a vent, a charge-testing device mounted in said closure independently of said vent and comprising a transparent hollow member containing a plurality of detached bodies of predetermined and differing densities, and a bulb at the top of said member for drawing electrolyte from the container into the member when the closure is in position in the said port, said bulb having an opening operative when desired to admit air to the said hollow member.

LAWRENCE J. PEARSON.